(12) United States Patent
Yamada

(10) Patent No.: US 10,146,056 B2
(45) Date of Patent: Dec. 4, 2018

(54) IMAGE DISPLAY APPARATUS HAVING A DIFFRACTION OPTICAL ELEMENT

(71) Applicant: SEIKO EPSON CORPORATION, Tokyo (JP)

(72) Inventor: Fumika Yamada, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 353 days.

(21) Appl. No.: 14/989,306

(22) Filed: Jan. 6, 2016

(65) Prior Publication Data

US 2016/0202485 A1 Jul. 14, 2016

(30) Foreign Application Priority Data

Jan. 9, 2015 (JP) ................................ 2015-002932

(51) Int. Cl.
*G02B 27/01* (2006.01)
*G02B 26/10* (2006.01)

(52) U.S. Cl.
CPC ......... *G02B 27/0172* (2013.01); *G02B 26/10* (2013.01); *G02B 2027/0118* (2013.01); *G02B 2027/0174* (2013.01); *G02B 2027/0178* (2013.01)

(58) Field of Classification Search
None
See application file for complete search history.

(56) References Cited

U.S. PATENT DOCUMENTS

| 5,790,284 | A * | 8/1998 | Taniguchi | G02B 5/32 345/7 |
| 9,846,307 | B2 * | 12/2017 | Tremblay | G02B 27/0172 |
| 9,885,877 | B2 * | 2/2018 | Yonekubo | G02B 27/4227 |
| 2004/0108971 | A1 * | 6/2004 | Waldern | G02B 27/0093 345/8 |
| 2007/0070504 | A1 | 3/2007 | Akutsu et al. | |
| 2009/0174919 | A1 * | 7/2009 | Moss | G02B 27/225 359/23 |
| 2010/0060551 | A1 | 3/2010 | Sugiyama et al. | |
| 2013/0222384 | A1 * | 8/2013 | Futterer | G02B 5/32 345/426 |

FOREIGN PATENT DOCUMENTS

| JP | 2007-094175 A | 4/2007 |
| WO | 2009/041055 A1 | 4/2009 |

* cited by examiner

*Primary Examiner* — David D Davis
(74) *Attorney, Agent, or Firm* — Oliff PLC

(57) ABSTRACT

An image display apparatus includes a light source configured to emit image light, a scanning mirror configured to reflect the image light from the light source, and a reflective diffraction optical element configured to change a direction of the image light from the scanning mirror to a different direction in addition to regular reflection. The scanning mirror is arranged at a position and a height as different from an observing point as possible. A direction of extension of an interference fringe of the reflective diffraction optical element intersects incident light from the light source.

11 Claims, 11 Drawing Sheets

FIG. 8A (PRIOR ART)
FIG. 8B (PRIOR ART)
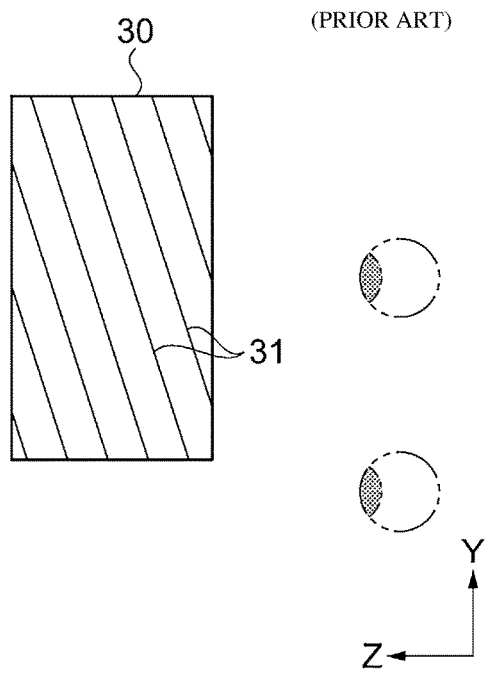
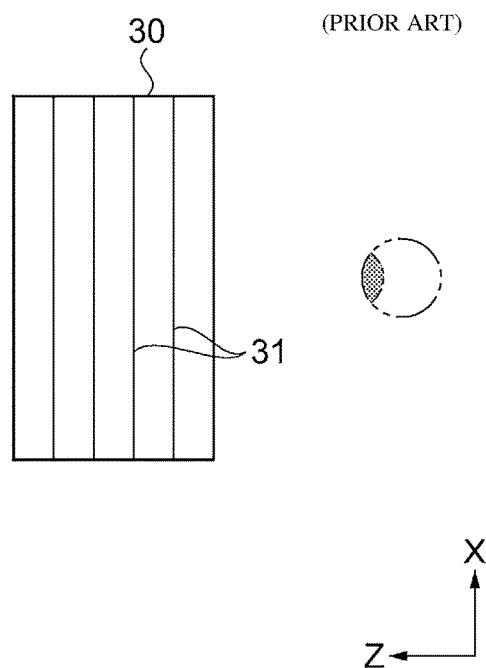
FIG. 9
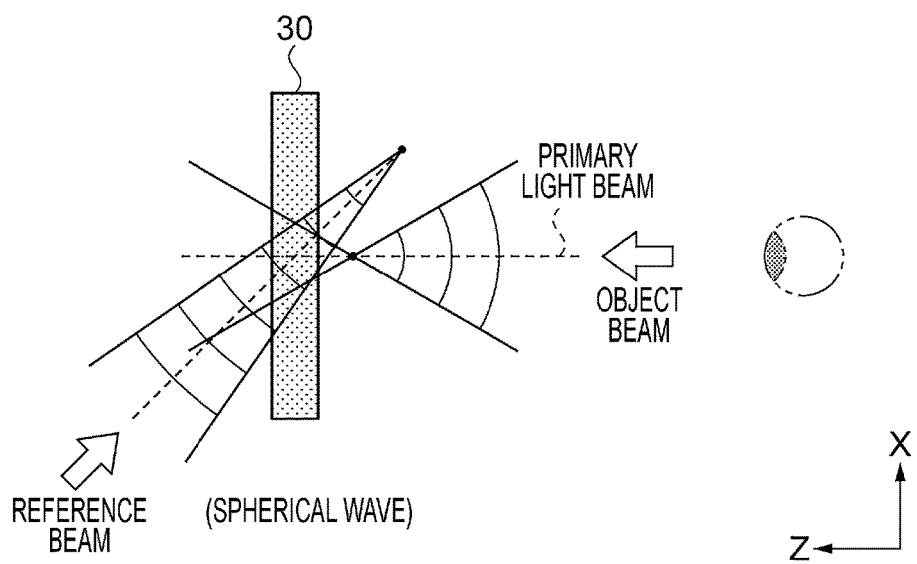

IMAGE DISPLAY APPARATUS HAVING A DIFFRACTION OPTICAL ELEMENT

BACKGROUND

1. Technical Field

The invention relates to an image display apparatus and a method of manufacturing the image display apparatus.

2. Related Art

The image display apparatus described above is used in a head mounted display (HMD), for example, as described in International Publication No. 09/041055. Specifically, as illustrated in FIGS. 14A and 14B, the image display apparatus includes a light source 102 of a semiconductor laser beam or the like configured to emit light, a scanning mirror 103 configured to reflect light from the light source 102 onto a reflective diffraction optical element 104 composed of a MEMS device or the like and onto the reflective diffraction optical element 104 configured to deflect light from the scanning mirror 103 by diffraction and enables observation of the deflected light as a 1st order diffraction ray.

FIG. 14A is a schematic plan view of an image display apparatus which constitutes part of the head mounted display viewed from above. FIG. 14B is a schematic side view of the image display apparatus illustrated in FIG. 14A viewed from the side. Only an optical system for a right eye is illustrated as an example. In this configuration, a video image can be observed simultaneously while viewing the background by applying a transparent property.

However, as illustrated in FIGS. 14A and 14B, there is a case where a 0 order diffraction ray (image light) which is regularly reflected by the reflective diffraction optical element 104 enters an opposite eye (left eye) to the eye on the optical system side (right eye), for example. Accordingly, unintended and unnecessary light enters the left eye, and hence there arises a case where the quality of a displayed image is lowered such that a bright point (ghost image, for example) is seen.

SUMMARY

Applications of the invention may be implemented as the following modes or applications.

Application 1

An image display apparatus of this application is an image display apparatus configured to display an image in at least one of one eye and the other eye, including an image generation unit configured to emit image light having a planar wave proceeding in a first direction; and a first diffraction optical element configured to deflect a proceeding direction of the image light from the image generation unit to a second direction by diffraction to cause the deflected image light to enter the one eye, wherein the first diffraction optical element includes a planar interference fringe formed in the interior thereof, and the first diffraction optical element is arranged such that a normal line of the planar interference fringe intersects a plane including the second direction and a third direction, which corresponds to a direction connecting the one eye and the other eye.

According to this application, since the first diffraction optical element is arranged such that the normal line of the interference fringe intersects the plane including the second direction and the third direction, a 1st order diffraction ray (image light proceeding in a different direction from a direction of a regular reflection) reflected from the first diffraction optical element can be proceeded toward the observing point. The 0 order diffraction ray (the regularly reflected image light) reflected from the first diffraction optical element may be released to a direction having a different height from the observing point. Therefore, for example, deterioration of image quality caused by the image light for the right eye entering the left eye on the opposite side can be restricted.

Application 2

An image display apparatus of this application is an image display apparatus configured to display an image in at least one of one eye and the other eye. The image display apparatus includes an image generation unit configured to emit image light having a spherical wave centered in a first direction. The image display apparatus further includes a first diffraction optical element configured to deflect the image light from the image generation unit so as to be centered in a second direction by diffraction to cause the deflected image light to enter the one eye. The first diffraction optical element includes a spherical interference fringe formed in the interior thereof. The first diffraction optical element is arranged such that a direction of an axis of the spherical interference fringe intersects a plane including the second direction and a third direction. The third direction corresponds to a direction connecting the one eye and the other eye.

According to this application, since the first diffraction optical element is arranged such that the direction of the axis of the interference fringe intersects the plane including the second direction and the third direction, the 1st order diffraction ray (image light proceeding in a different direction from a direction of a regular reflection) reflected from the first diffraction optical element may be proceeded toward the observing point. The 0 order diffraction ray (the regularly reflected image light) reflected from the first diffraction optical element may be released to a direction having a different height from the observing point. Therefore, for example, deterioration of image quality caused by the image light for the right eye entering the left eye on the opposite side can be restricted.

Application 3

In this case, preferably, the image generation unit is not arranged on a plane including the second direction and the third direction, and the first direction intersects the plane.

According to this application, with an arrangement of the image generation unit as described above, the 1st order diffraction ray (image light proceeding in a different direction from the direction of the regular reflection) reflected from the first diffraction optical element may be proceeded toward the observing point. The 0 order diffraction ray (the regularly reflected image light) reflected from the first diffraction optical element may be released to a direction having a different height from the observing point. Therefore, for example, deterioration of image quality caused by the image light for the right eye entering the left eye on the opposite side can be restricted.

Application 4

In this case, preferably, the image generation unit includes a light source that emits light and a scanning mirror configured to scan the light so as to generate the image.

According to this application, with additional provision of the image generation unit and the scanning mirror to the configuration described above, the image light can be emitted and an image can be displayed on retina of the user's eye by modulating the image light.

Application 5

In this case, preferably, the interference fringe of the first diffraction optical element is formed of a portion having a first refractive index and a portion having a second refractive index, which is different from the first refractive index.

According to this application, since an interference fringe is formed in the portions having the different refractive index, incident light diffracted by the interference fringe may be proceeded toward the observing point.

Application 6

In this case, preferably, the first diffraction optical element is a volume hologram.

According to this application, since a volume hologram is used, diffraction with a relatively high efficiency is achieved.

Application 7

In this case, preferably, the first diffraction optical element has a curved end portion.

According to this application, since the first diffraction optical element has a curve, a reduction of a light incident angle with respect to a direction of an interference fringe is enabled, and distortion in shape of field and correction of astigmatism can be achieved by the curvature of a substrate.

Application 8

In this case, preferably, a second diffraction optical element is arranged between the image generation unit and the first diffraction optical element so as to compensate light having a wavelength deviated from a predetermined wavelength included in the image light.

According to this application, since the second diffraction optical element is arranged between the image generation unit and the first diffraction optical element, even in the case where the wavelength of the light from the light source is deviated from a regular wavelength from the light source due to a high-speed modulation in which light modulation is performed at a high speed, the wavelength may be shifted in advance in a direction of compensating the deviation from the regular wavelength before the entry into the first diffraction optical element by the intermediary of the second diffraction optical element. Only light having the regular wavelength is allowed to enter toward the scanning mirror. In other words, the second diffraction optical element may be used as wavelength compensation.

Application 9

An image display apparatus of this application is an image display apparatus configured to display an image in each of one eye and the other eye, including: a first image generation unit configured to emit image light having a spherical wave; and a first diffraction optical element configured to deflect the image light from the first image generation unit so as to be centered in a first direction by diffraction to cause the deflected light to enter the one eye, a second image generation unit configured to emit image light having a spherical wave; and a third diffraction optical element configured to deflect the image light from the second image generation unit so as to be centered in a second direction by diffraction to cause the deflected light to enter the other eye, wherein the first diffraction optical element and the third diffraction optical element each include spherical interference fringe formed in the interior thereof, and the first diffraction optical element is arranged such that the direction of the axis of the spherical interference fringe intersects a plane including the first direction and a third direction, which corresponds to a direction connecting the one eye and the other eye, and the third diffraction optical element is arranged such that the direction of the axis of the spherical interference fringe intersects a plane including the second direction and the third direction.

According to this application, since the first diffraction optical element and the third diffraction optical element are arranged as described above, the 1st order diffraction ray (image light proceeding in a different direction from a direction of a regular reflection) reflected from the first diffraction optical element and the third diffraction optical element can be proceeded toward the observing point. The 0 order diffraction ray (the regularly reflected image light) reflected from the first diffraction optical element and the third diffraction optical element may be released to a direction having a different height from the observing point. Therefore, for example, deterioration of image quality caused by the image light for the right eye entering the left eye on the opposite side can be restricted. In addition, deterioration of image quality caused by the image light for the left eye entering the right eye on the opposite side can be restricted.

Application 10

A method of manufacturing an image display apparatus of this application is a method of manufacturing an image display apparatus configured to display an image in at least one of one eye and the other eye. The method includes preparing a base material, and forming a planar interference fringe in the interior of the base material by performing interference exposure on the base material with a reference beam having a planar wave proceeding in a first direction and an object beam having a planar wave proceeding in a second direction. The method further includes arranging an image generation unit configured to emit image light having a planar wave and the base material which has been subjected to the interference exposure. Arranging the base material is arranging the image generation unit and the base material such that a normal line of the planar interference fringe intersects a plane including the second direction and a third direction (which corresponds to a direction connecting the one eye and the other eye) to cause the image light having the planar wave to enter the base material in the first direction. It also causes the entered image light to be diffracted by the base material, proceed in the second direction, and enter the one eye.

According to this application, since the base material which has been subjected to the interference exposure with the planar wave of two beams (the object beam and the reference beam) is arranged such that a normal line of the interference fringe intersects with a plane including the second direction and the third direction as described above, the 1st order diffraction ray (image light proceeding in a different direction from the direction of the regular reflection) reflected from the first diffraction optical element can be proceeded toward the observing point. The 0 order diffraction ray (the regularly reflected image light) reflected from the first diffraction optical element may be released to a direction having a different height from the observing point. Therefore, for example, deterioration of image quality caused by the image light for the right eye entering the left eye on the opposite side can be restricted.

Application 11

A method of manufacturing an image display apparatus of this application is a method of manufacturing an image display apparatus configured to display an image in at least one of one eye and the other eye. The method includes preparing a base material, and performing interference exposure on the base material with a reference beam having a spherical wave centered in a first direction and an object beam having the a spherical wave centered in a second direction to form a spherical interference fringe in the interior of the base material. The method further includes arranging an image generation unit configured to emit image light having a spherical wave and the base material which has been subjected to the interference exposure. The arranging the base material is arranging the image generation unit and the base material with a direction of an axis of the spherical interference fringe intersecting a plane including the second direction and a third direction (which corresponds to a direction connecting the one eye and the other eye) such that the image light having the spherical wave enters the base material centered in the first direction. This also causes the entered image light to be diffracted by the base material and enter the one eye so as to be centered in the second direction.

According to this application, since the base material which has been subjected to the interference exposure with the spherical wave of two beams (the object beam and the reference beam) is arranged such that a direction of the axis of the interference fringe intersects a plane including the second direction and the third direction described above, the 1st order diffraction ray (image light proceeding in a different direction from the direction of the regular reflection) reflected from the first diffraction optical element may be proceeded toward the observing point. The 0 order diffraction ray (the regularly reflected image light) reflected from the first diffraction optical element may be released to a direction having a different height from the observing point. Therefore, for example, deterioration of image quality caused by the image light for the right eye entering the left eye on the opposite side can be restricted.

BRIEF DESCRIPTION OF THE DRAWINGS

The invention will be described with reference to the accompanying drawings.

FIGS. 8A and 8B are schematic drawings illustrating a pattern of an interference fringe of a reflective diffraction optical element of the related art.

FIG. 9 is a schematic drawing illustrating a method of performing exposure by using a spherical wave in the reflective diffraction optical element.

DESCRIPTION OF EXEMPLARY EMBODIMENTS

Hereinafter, embodiments of the invention will be described with reference to the drawings. The drawings herein are illustrated in an enlarged or reduced scale, as needed, so that a portion to be explained is recognizable.

First Embodiment

Configuration of Mounting-Type Image Display Apparatus

Figure 1:
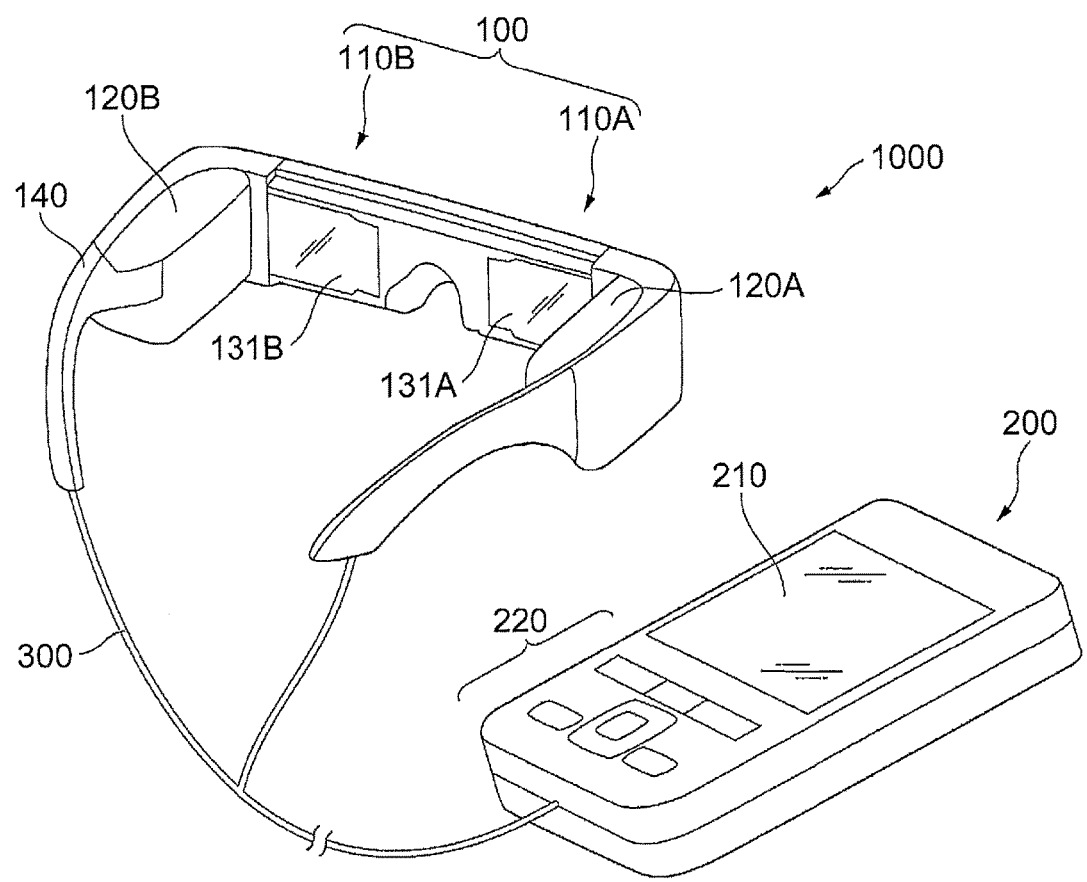
FIG. 1 is a schematic perspective view illustrating an entire image of a head mounted display (END) as a mounting-type image display apparatus provided with an image display apparatus of a first embodiment.
Figure 2:
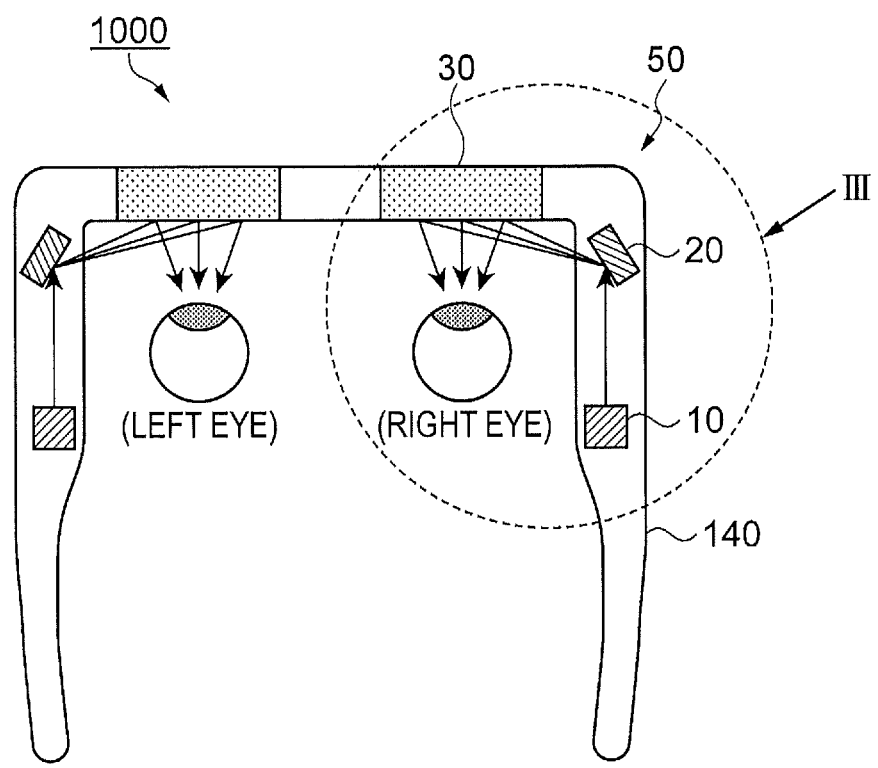
FIG. 2 is a diagrammatic plan view of the head mounted display viewed from above.

FIG. 1 is a schematic perspective view illustrating an entire image of a head mounted display (HMD) as a mounting-type image display apparatus provided with an image display apparatus. FIG. 2 is a diagrammatic plan view of the head mounted display viewed from above. Hereinafter, a configuration of the head mounted display will be described with reference to FIG. 1 and FIG. 2.

As illustrated in FIG. 1, a head mounted display 1000 includes a main body portion 100 having a shape resembling spectacles, and a control unit 200 having a size that a user can hold with his/her hand.

The main body portion 100 and the control unit 200 are connected so as to be communicable with each other via a line or radio waves. In this embodiment, the main body portion 100 and the control unit 200 are communicably connected via a cable 300. The main body portion 100 and the control unit 200 transmit an image signal and a control signal to each other via the cable 300.

The main body portion 100 includes a display unit for a right eye 110A and a display unit for a left eye 110B. The display unit for the right eye 110A includes an image generation unit 120A configured to form image light having a planar wave of an image for the right eye. The display unit for the left eye 110E includes an image generation unit 120B configured to form image light having a planar wave of an image for the left eye.

The image generation unit 120A is housed in a temple side (right side) of the spectacles in the spectacles-type main body portion 100. In contrast, the image generation unit 120B is stored in a temple side (left side) of the spectacles in the spectacles-type main body portion 100.

In the main body portion 100, a visible portion 131A having light transparency is provided. The visible portion 131A emits image light of the image for the right eye toward the right eye (one eye) of the user. In the head mounted display 1000, the visible portion 131A has light transparency and is capable of viewing the periphery via the visible portion 131A.

In the main body portion 100, a visible portion 131B having light transparency is provided. The visible portion 131B emits image light of the image for the left eye toward the left eye (other eye) of the user. In the head mounted display 1000, the visible portion 131B has light transparency and is capable of viewing the periphery via the visible portion 131B.

The control unit 200 includes an operating portion 210 and an operating button portion 220. The user performs operation and input to the operating portion 210 or the operating button portion 220 of the control unit 200 and issues an instruction to the main body portion 100.

As illustrated in FIG. 2, the head mounted display 1000 includes a light source 10 and a scanning mirror 20 that constitutes part of the image generation unit arranged in a frame 140 portion. Although only the right side portion of the frame 140 is designated by a reference sign, the left side of the frame has the same configuration.

The light source 10 has a semiconductor laser beam and is a laser beam including laser beams output from a red laser light source, a blue laser light source, and a green laser light source respectively combined with each other. A laser beam having an arbitrary laser beam may be output by adequately modulating outputs from the laser light source for the respective colors. In addition, by the modulation in conjunction with the scanning mirror 20 or the like which will be described later, a video image may be displayed on the retina of the user's eye.

The frame 140 includes reflective diffraction optical elements 30 as first diffraction optical elements for displaying video images on the retinas of the user's eyes that are arranged to correspond to the right eye (the first diffraction optical element) and the left eye (third diffraction optical element). At the least, the light source 10, the scanning mirror 20, and the reflective diffraction optical element 30 constitute an image display apparatus 50. The image display apparatus 50 will be subsequently described.

Configuration of Image Display Apparatus

Figure 3A:
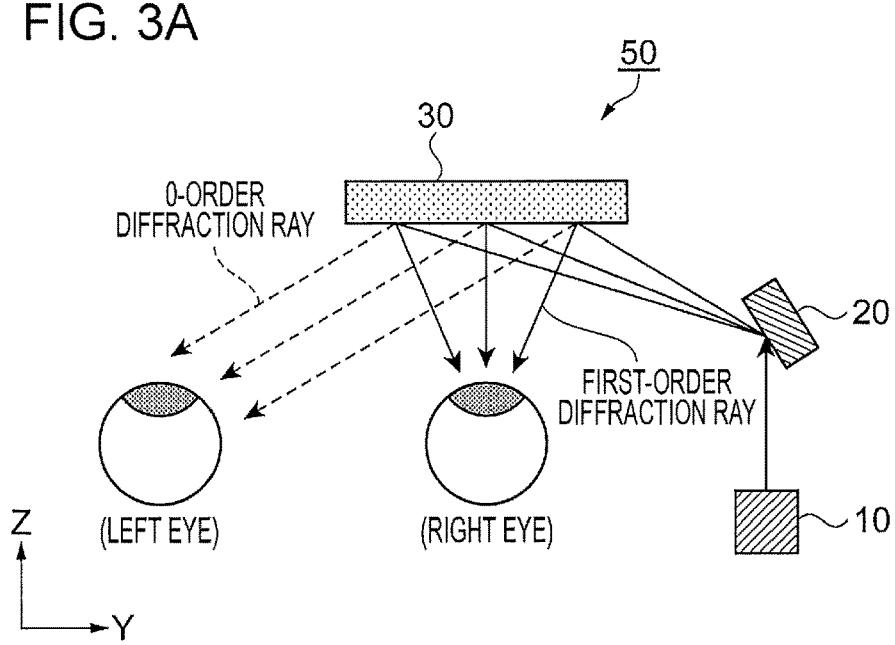
FIGS. 3A and 3B are schematic drawings illustrating a configuration of the image display apparatus of a portion III of the head mounted display illustrated in FIG. 2 in an enlarged scale.
Figure 3B:
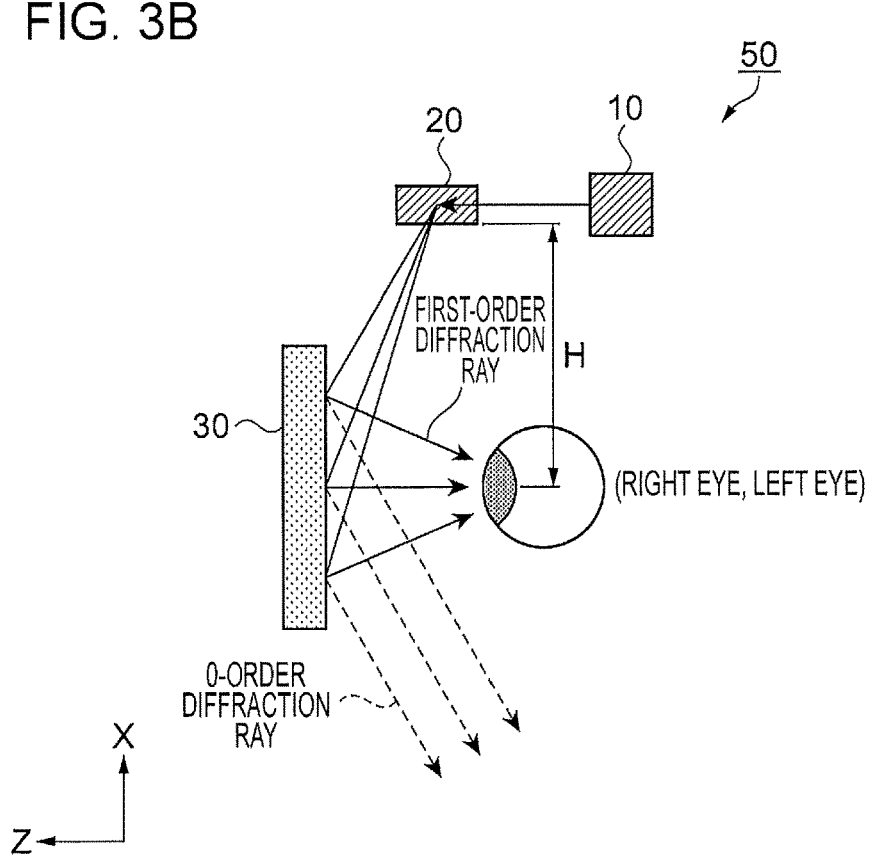

FIGS. 3A and 3B are schematic drawings illustrating a configuration of the image display apparatus of a portion III of the head mounted display illustrated in FIG. 2 in an enlarged scale. FIG. 3A is a schematic plan view illustrating a configuration of the image display apparatus. FIG. 3B is a schematic side view of the image display apparatus illustrated in FIG. 3A viewed from a Y-axis side (left eye side). A configuration of the image display apparatus will be described with reference to FIGS. 3A and 3B below.

As illustrated in FIGS. 3A and 3B, the image display apparatus 50 includes the light source 10, the scanning mirror 20 configured to reflect light from the light source 10, and a reflective diffraction optical element 30 configured to diffract light reflected by the scanning mirror 20 and display the diffracted light to an observer.

The light source 10 as described above is a laser beam including laser beams of the respective colors combined with each other. The scanning mirror 20 includes, for example, a MEMS device. Specifically, the scanning mirror 20 is configured to control the mirror by oscillating at a certain frequency, and a reduction in size is realized.

The reflective diffraction optical element 30 is formed of a flat material and includes a volume hologram, a surface relief hologram, a blaze diffraction grating, and the like. When using the volume hologram, diffraction with a relatively high efficiency is achieved. The surface relief hologram has a superior high-volume production property so that manufacturing costs may be reduced.

In this embodiment, it is assumed that the volume hologram is used. The volume hologram includes, for example, a low refractive index layer (low refractive index portion, first refractive index) and a high refractive index layer (high refractive index portion, second refractive index) stacked alternately (see FIGS. 6A and 6B). In other words, a plane interference fringe 31 (see FIGS. 6A and 6B) is formed of low refractive index layers and high refractive index layers. The volume hologram may be formed, for example, by interference exposure (see FIGS. 4A and 4B).

With the reflective diffraction optical element 30 as described above, a typical mirror can only reflect light in a regular manner. However, as illustrated in FIG. 3A, the direction of light can be changed to an arbitrary direction in addition to the regular reflection. Compared with the general mirror, the reflective diffraction optical element 30 may be reduced in size.

The reflective diffraction optical element 30 causes outside light entering from outside the head mounted display 1000 to pass therethrough to allow the observer to observe the background. Specifically, the wavelength of the laser beam from the light source 10 has a narrow band and the wavelength of the outside light has a broad band. Therefore, the outside light can be observed through the reflective diffraction optical element 30 configured to selectively reflect light having a wavelength included in the light source 10. In other words, the head mounted display 1000 of the embodiment has a transparent property, and the image can be seen simultaneously with the background.

As illustrated in FIG. 3B, the reflective diffraction optical element 30 is arranged so as to face the eye. The reflective diffraction optical element 30 is designed to diffract the light from the scanning mirror 20 and direct the light so as to enter the right eye as a 1st order diffraction ray.

The scanning mirror 20 is arranged at a position other than a plane (YZ plane) including a Z-axis perpendicular to the center of a pupil and a Y-axis connecting centers of both eyes. In this embodiment, the scanning mirror 20 is arranged at a position H higher than the YZ plane (the height of the eye).

Specifically, assuming that the pupil diameter is, for example, 4 mm, the scanning mirror 20 only needs to be arranged at a height H not lower than at least 2 mm from the center of the pupil. The upper limit of the height from the center of the pupil, for example, falls within a range within which the head mounted display 1000 can function.

In this arrangement, the 0 order diffraction ray included in incident light that has entered the reflective diffraction optical element 30 from the scanning mirror 20 proceeds at a height different from that of the left eye and does not enter the left eye.

In contrast, the 1st order diffraction ray included in the incident light that has entered the reflective diffraction optical element 30 from the scanning mirror 20 enters the right eye. Therefore, the image is visible. The direction of the 0 order diffraction ray and the 1st order diffraction ray may be adjusted depending on how the exposure optical system is configured when manufacturing the reflective diffraction optical element 30.

Figure 4A:
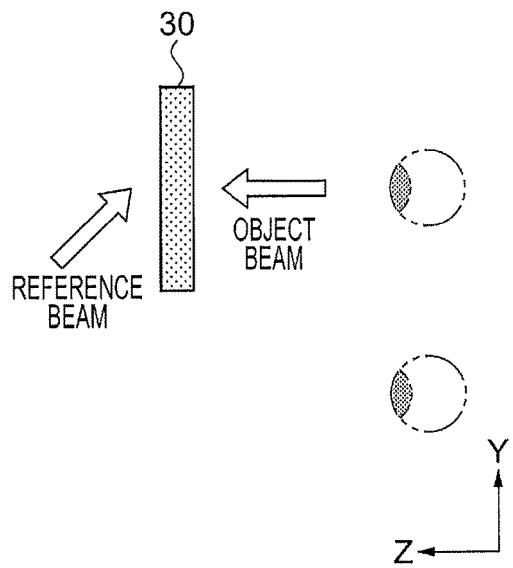
FIGS. 4A and 4B are schematic drawings illustrating a method of manufacturing a reflective diffraction optical element.
Figure 4B:
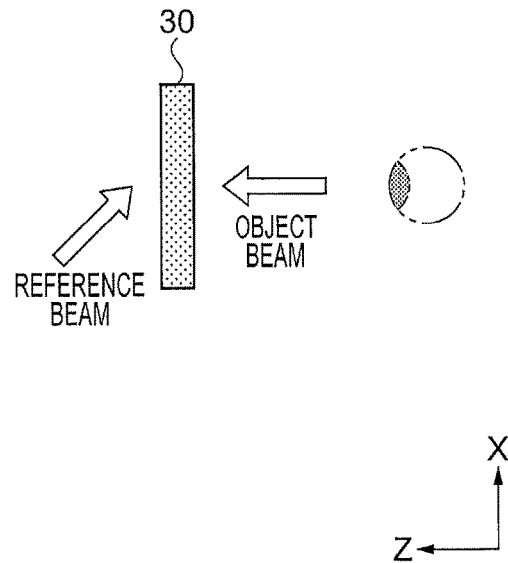
Figure 5:
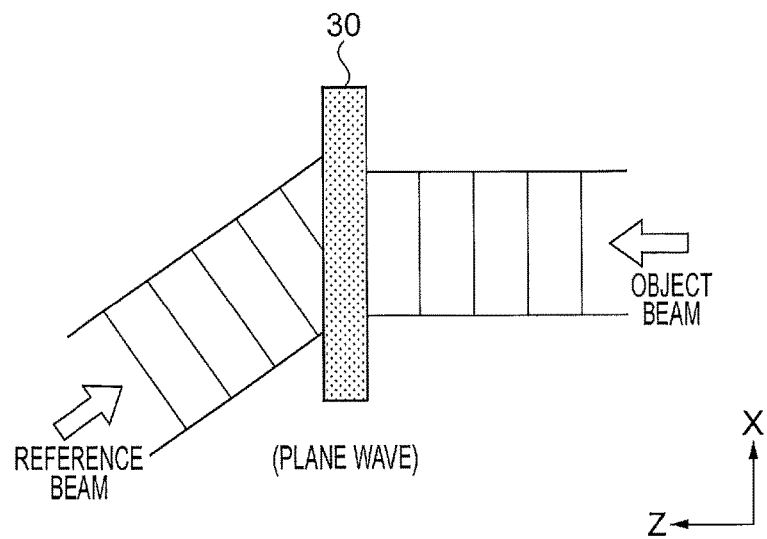
FIG. 5 is a schematic drawing illustrating a method of exposing the reflective diffraction optical element by using a planar wave (an exposure arrangement).
Figure 6A:
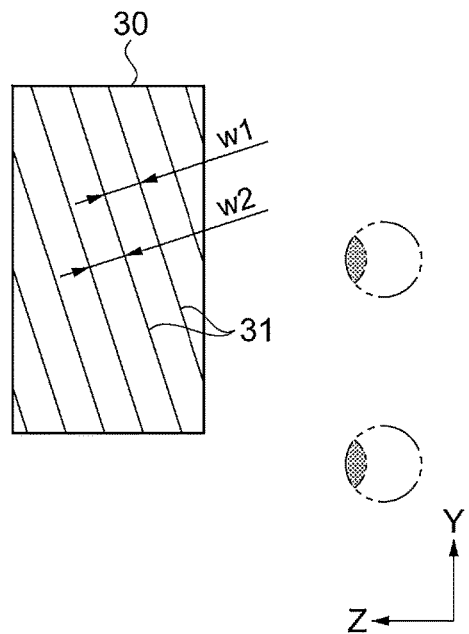
FIGS. 6A and 6B are schematic drawings illustrating a pattern of an interference fringe of the reflective diffraction optical element.
Figure 6B:
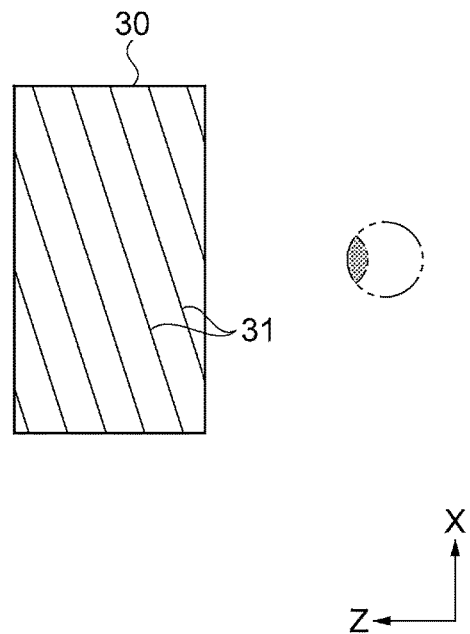

FIGS. 4A and 4B are schematic drawings illustrating a method of manufacturing a reflective diffraction optical element. FIG. 5 is a schematic drawing illustrating a method (an exposure arrangement) of exposing the reflective diffraction optical element by using a planar wave. FIGS. 6A and 6B are schematic drawings illustrating a pattern of an interference fringe of the reflective diffraction optical element. The method of manufacturing the reflective diffraction optical element will be described with reference to FIGS. 4A and 4B, FIG. 5, and FIGS. 6A and 6B.

The reflective diffraction optical element 30 is a volume hologram as described above. As illustrated in FIGS. 4A and 4B, the exposure optical system for manufacturing the volume hologram is formed by interference exposure of two beams. The two beams include an object beam and a reference beam. Specifically, one of the surfaces of the reflective diffraction optical element 30 is exposed to the object beam having a planar wave (see FIG. 5), and the other surface is exposed to the reference beam having the planar wave so as to intersect the object beam. Characteristics of the reflective diffraction optical element 30 (volume hologram) are determined by the angle at which the object beam and the reference beam intersect.

As illustrated in FIGS. 4A and 4B, when the 0 order diffraction ray (regular reflection) is not parallel to the 1st order diffraction ray, the direction of exposure with at least one of the reference beam and the object beam is such that the direction of the optical axis thereof is at an angle with respect to the YZ plane.

As a method of exposure, a planar wave is used as illustrated in FIG. 5. In this manner, in the case of being recorded with the planar wave, the angle of the interference fringe 31 of the reflective diffraction optical element 30 is recorded at an angle other than an angle perpendicular to the Z-axis in the entire hologram as illustrated in FIGS. 6A and 6B. Since the planar wave is used, the recorded interference fringe 31 is also a straight (planar) pattern.

The interference fringe 31 illustrated in FIGS. 6A and 6B are schematic drawings with a photo polymer portion at an enlarged scale. The interference fringe 31 has a refractive index distribution of oblique lines. In other words, high refractive index and low refractive index are distributed alternately. A width of the high refractive index W1 and a width of the low refractive index W2 are substantially equivalent. A width of the interference fringe 31 is, for example, on the order of 400 nm to 800 nm.

In this manner, the interference fringe 31 of the reflective diffraction optical element 30 is recorded so as to extend obliquely both in top view (see FIG. 6A) and side view (see FIG. 6B).

Figure 7A:
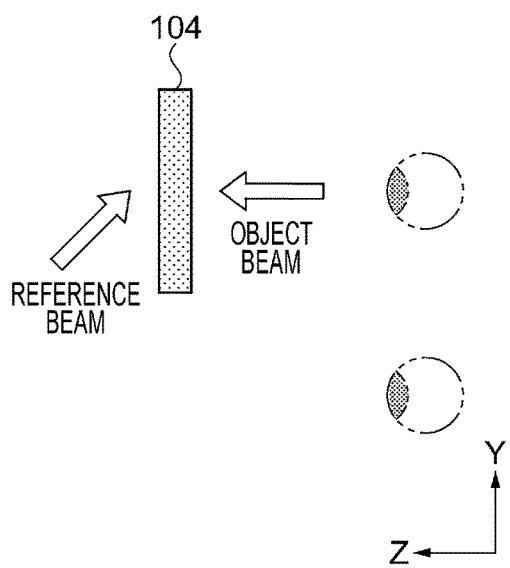
FIGS. 7A and 7B are schematic drawings illustrating a method of manufacturing a reflective diffraction optical element of the related art (an exposure arrangement).
Figure 7B:
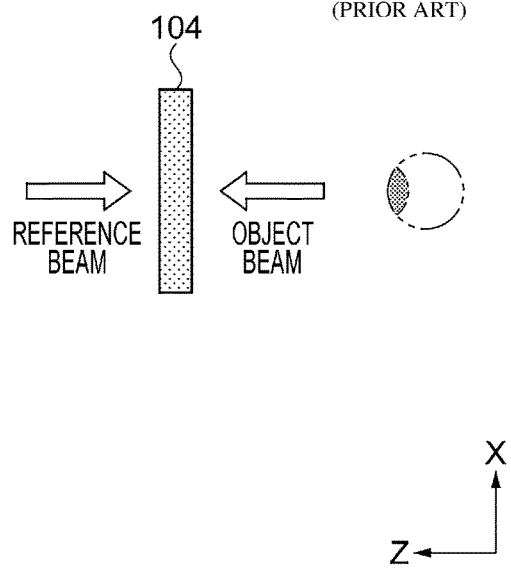

FIGS. 7A and 7B are schematic drawings illustrating a method (an exposure arrangement) of manufacturing a reflective diffraction optical element of the related art as a comparative example. FIGS. 8A and 8B are schematic drawings illustrating a pattern of an interference fringe of the reflective diffraction optical element of the related art. The method of manufacturing the reflective diffraction optical element of the related art will be described with reference to FIGS. 7A and 7B, FIGS. 8A and 8B, and FIGS. 14A and 14B below.

Figure 14A:
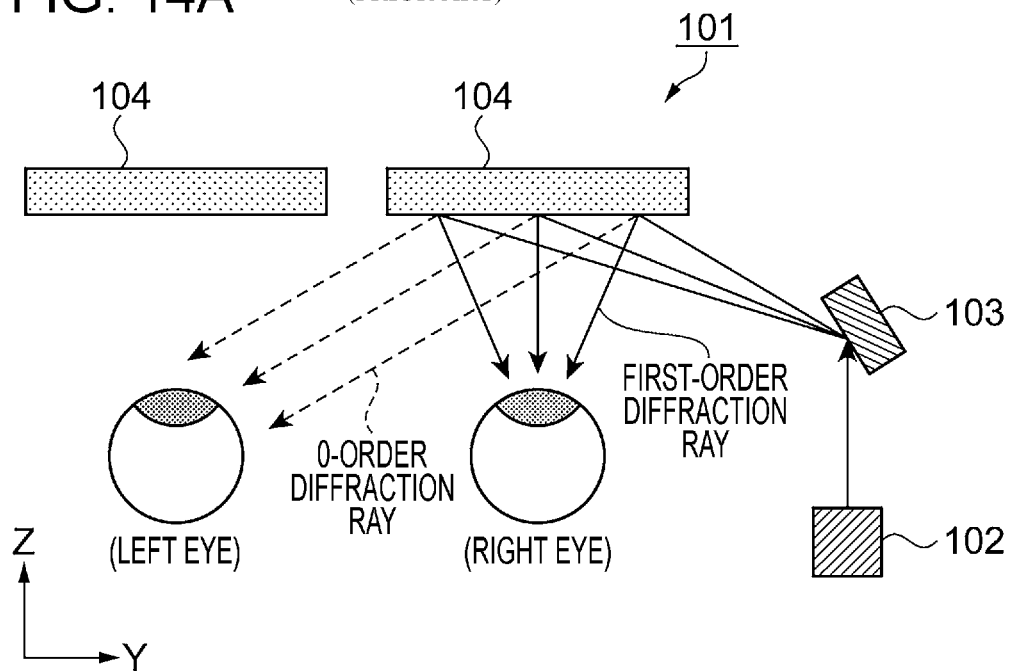
FIGS. 14A and 14B are schematic drawings illustrating a configuration of the image display apparatus of the related art.
Figure 14B:
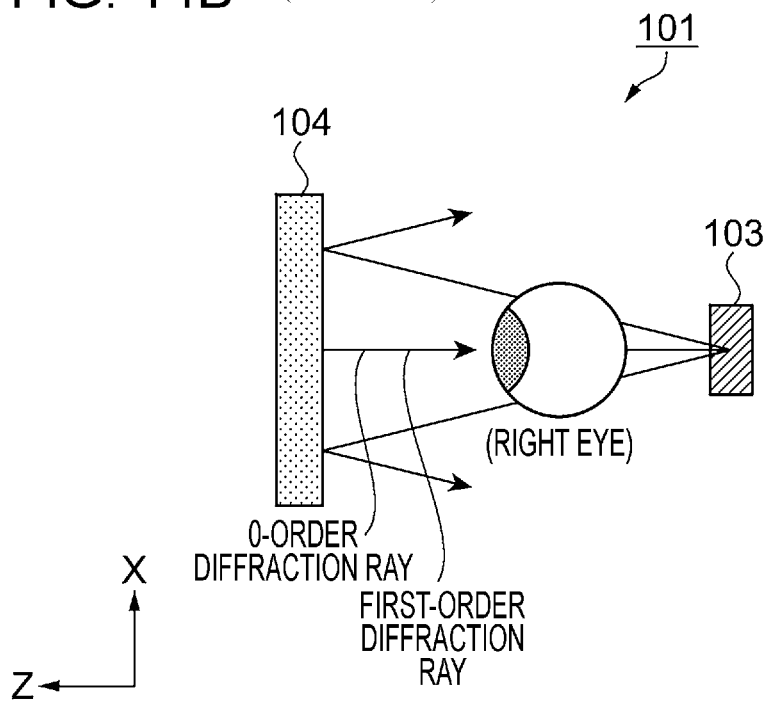

As illustrated in FIGS. 14A and 14B, with an image display apparatus 101 of the related art, the 0 order diffraction ray may enter the left eye. In the case where the 0 order diffraction ray (regular reflection) and the 1st order diffraction ray proceed at the same height (parallel to the YZ plane), image light which should enter the right eye also enters (unintended 0 order diffraction ray enters) the left eye (the eye on the opposite side), which leads to deterioration of the image. The apparatus is set such that a scanning mirror 103 and a reflective diffraction optical element 104 are positioned at the same height in the case where the 0 order diffraction ray enters the left eye.

As illustrated in FIGS. 7A and 7B, the reflective diffraction optical element 104 of the related art is formed by interference exposure, in which a laser beam is split into two parts and irradiates a hologram material with light. In the method of manufacturing in the related art, the reflective diffraction optical element 104 is manufactured such that the height of the scanning mirror 103 and the height of the eye are the same. In other words, since the height of the scanning mirror 103 and the height of the eye are the same, the entire optical system (reference beam and object beam) are arranged on the same plane at the time of manufacture.

Specifically, both the reference beam and the object beam are exposed with the optical axes thereof oriented parallel to the YZ plane. In other words, exposure with the reference beam and exposure with the object beam are performed at the same height. In addition, when viewed from above, exposure with the reference beam and exposure with the object beam are slightly changed in angle. The surface of the interference fringe 31 of the volume hologram recorded at this time is recorded in a direction perpendicular to the Z plane.

Figure 10:
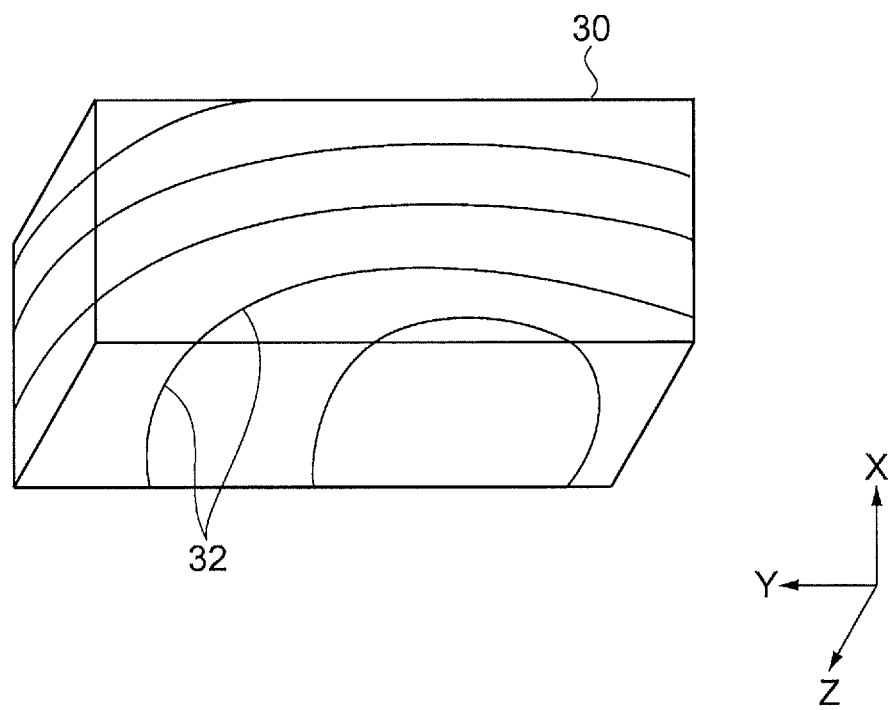
FIG. 10 is a schematic drawing illustrating a pattern of an interference fringe of the reflective diffraction optical element exposed by using the spherical wave.

FIG. 9 is a schematic drawing illustrating a method of performing exposure of the volume hologram (reflective diffraction optical element) with a spherical wave. FIG. 10 is a schematic drawing illustrating a pattern of an interference fringe of the reflective diffraction optical element exposed by using the spherical wave. A method of exposure by using the spherical wave will be described with reference to FIG. 9 and FIG. 10 below.

As illustrated in FIG. 9, in the case of exposure with the spherical wave (when recording with the spherical wave), inclination conditions of interference fringe 32 are satisfied at a position where a principal ray (a ray passing through the center of light) passes. The position of the spherical wave where the object beam intersects corresponds to the position of the eye. The position of the spherical wave where the reference beam converges corresponds to the position of the scanning mirror. In this manner, when the volume hologram is exposed, the interference fringe 32 having a spherical shape as illustrated in FIG. 10 is generated.

In a method of manufacturing by using the spherical wave of the related art, the center of the object beam and the center of the reference beam are located at the same height. However, since the center of the object beam and the center of the reference beam have a different height in this embodiment (since the position of the scanning mirror 20 is higher than the height of the eye), the 1st order diffraction ray reflected from the reflective diffraction optical element 30 can enter the eye. In addition, the 0 order diffraction ray reflected from the reflective diffraction optical element 30 is allowed to proceed downward with respect to the height of the eye. Therefore, the 0 order diffraction ray is prevented from entering the left eye.

As described thus far in detail, according to the image display apparatus 50 and the method of manufacturing the image display apparatus 50 of the first embodiment, the following advantages are achieved.

(1) According to the image display apparatus 50 of the first embodiment, the scanning mirror 20 is arranged at a height different from the observing point, the image light enters the reflective diffraction optical element 30 having the interference fringes 31 and 32 extending so as to intersect the incident light, and the 1st order diffraction ray (image light proceeding in a direction different from regular reflection) reflected from that of the reflective diffraction optical elements 30 is caused to proceed toward the observing point. The 0 order diffraction ray (the regularly reflected image light) reflected from the reflective diffraction optical element 30 may be diverted to a direction having a different height from that of the observing point. Therefore, for example, deterioration of image quality caused by the image light for the right eye entering the left eye on the opposite side can be restricted. In other words, light which may become noise can be restricted from entering the eye.

(2) According to the method of manufacturing the image display apparatus 50 of the first embodiment, since the interference exposure is performed with the planar wave and the spherical wave of two beams (object beam and reference beam) as described above, if image light enters the reflective diffraction optical element 30 from a height different from the height of the observing point, the 1st order diffraction ray proceeds toward the observing point, and the 0 order diffraction ray can proceed toward the height different from the height of the observing point. Therefore, for example, deterioration of image quality caused by the image light for the right eye entering the left eye on the opposite side can be restricted.

Second Embodiment

Configuration of Image Display Apparatus

Figure 11A:
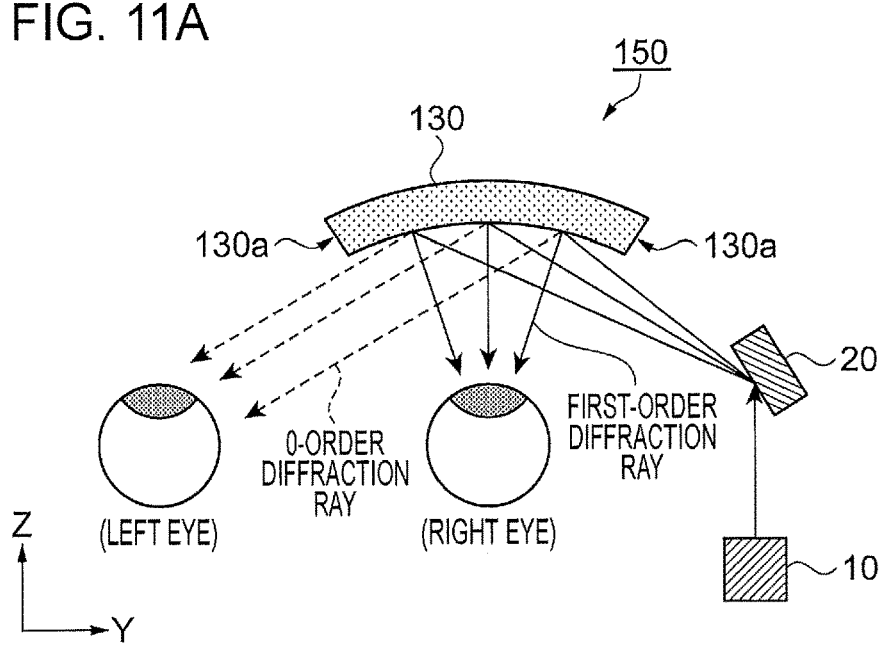
FIGS. 11A and 11B are schematic drawings illustrating a configuration of the image display apparatus of a second embodiment.
Figure 11B:
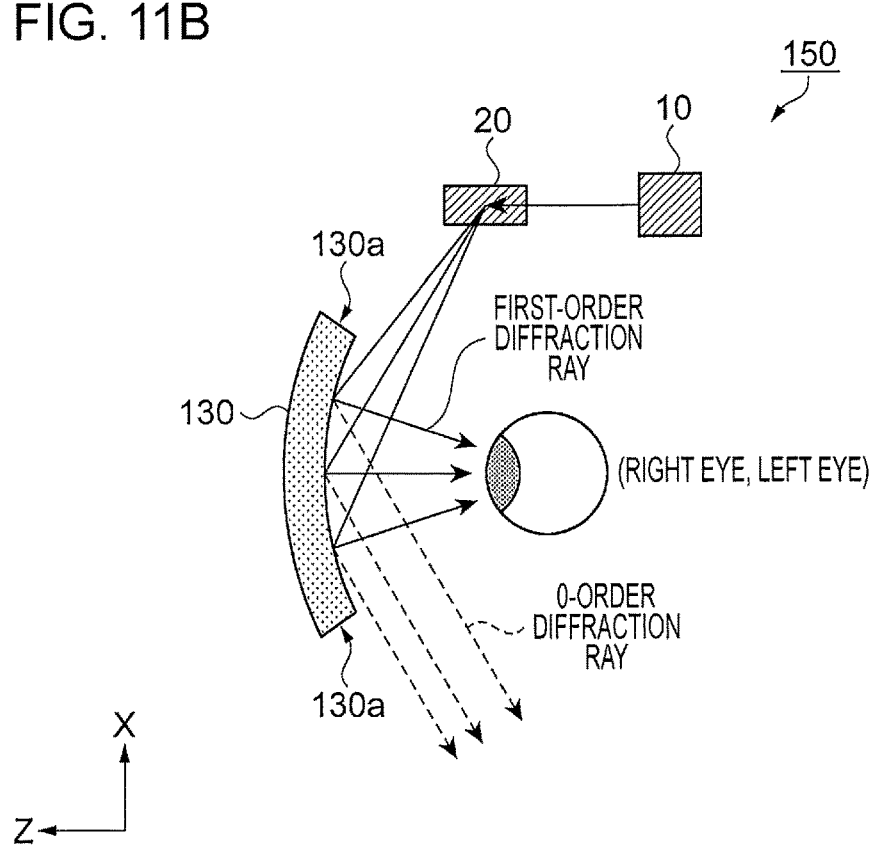
Figure 12A:
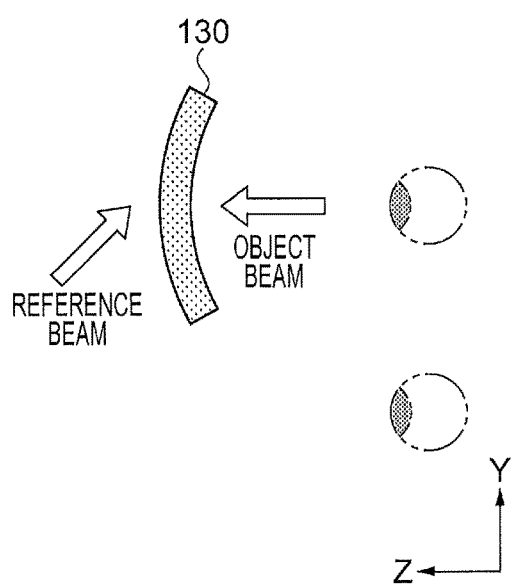
FIGS. 12A and 12B are diagrammatic drawings illustrating a method of manufacturing the reflective diffraction optical element which constitutes the image display apparatus.
Figure 12B:
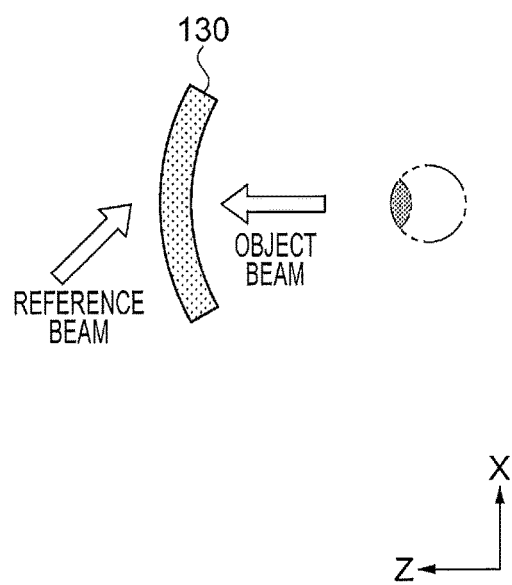

FIGS. 11A and 11B are schematic drawings illustrating a configuration of the image display apparatus of a second embodiment. FIG. 11A is a schematic plan view illustrating the image display apparatus viewed from above. FIG. 11B is a schematic side view illustrating the image display apparatus viewed from the side. FIGS. 12A and 12B are diagrammatic drawings illustrating a method of manufacturing the reflective diffraction optical element which constitutes the image display apparatus. FIG. 12A is a schematic plan view of the reflective diffraction optical element viewed from above. FIG. 12B is a schematic side view of the reflective diffraction optical element viewed from the side. Configurations of the image display apparatus and the reflective diffraction optical element, and the method of manufacturing the reflective diffraction optical element will be described with reference to FIGS. 11A and 11B and FIGS. 12A and 12B.

An image display apparatus 150 of a second embodiment is different from the image display apparatus 50 of the first embodiment described above in that the shape of a reflective diffraction optical element 130 is a curved shape (arcuate shape), and other portions are generally the same. Therefore, in the second embodiment, portions different from the first embodiment will be described in detail, and description of other overlapped portions is omitted as needed.

As illustrated in FIGS. 11A and 11B, the image display apparatus 150 of the second embodiment includes a light source 10, a scanning mirror 20 configured to reflect light from the light source 10, and a reflective diffraction optical element 130 configured to diffract image light reflected by the scanning mirror 20 and display the diffracted light to an observer in the same manner as the first embodiment.

The second embodiment is characterized in that the reflective diffraction optical element 130 is curved. Specifically, an end portion 130a of the reflective diffraction optical element 130 has a curved shape curved toward the light source 10. The direction of the curve may be opposite. Advantages of the curved shape are that distortion of field can be corrected and astigmatism can be reduced.

In addition, by combining the inclination of an interference fringe 31 which prevents a 0 order diffraction ray from entering an eye and a curved substrate, a bright image having less noise can be obtained.

A method of manufacturing the reflective diffraction optical element 130 of the second embodiment is substantially the same as that of the first embodiment. The reflective diffraction optical element 130 of the second embodiment is arranged instead of the reflective diffraction optical element 30 of the first embodiment. An X-axis, a Y-axis, and a Z-axis are aligned at the time of usage in the same manner as the first embodiment.

As described thus far in detail, according to the image display apparatus 150 of the second embodiment, the following advantages are achieved.

(3) According to the image display apparatus 150 of the second embodiment, since the reflective diffraction optical element 130 is formed into a curved shape, distortion of field can be corrected and astigmatism can be reduced.

Third Embodiment

Configuration of Image Display Apparatus

Figure 13A:
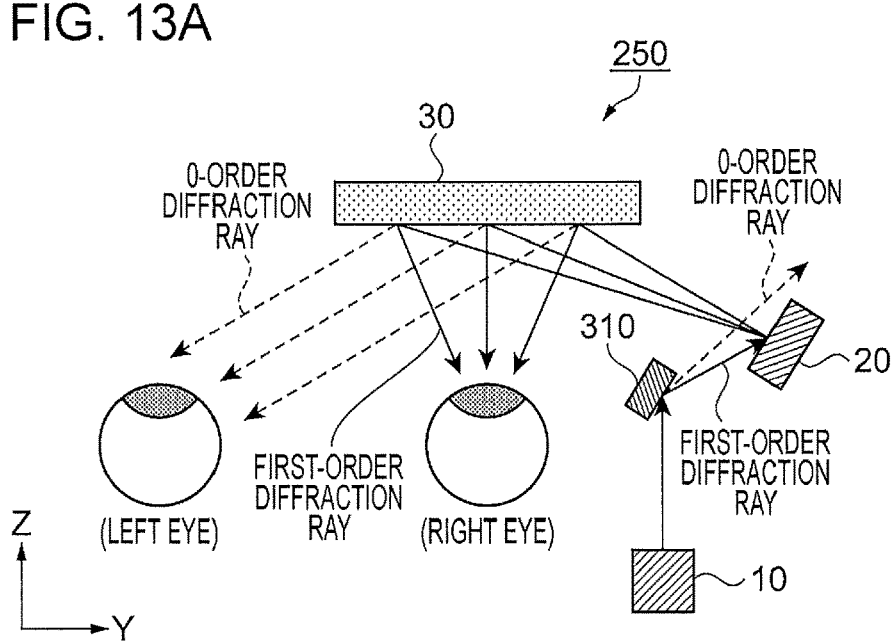
FIGS. 13A and 13B are schematic drawings illustrating a configuration of the image display apparatus of a third embodiment.
Figure 13B:
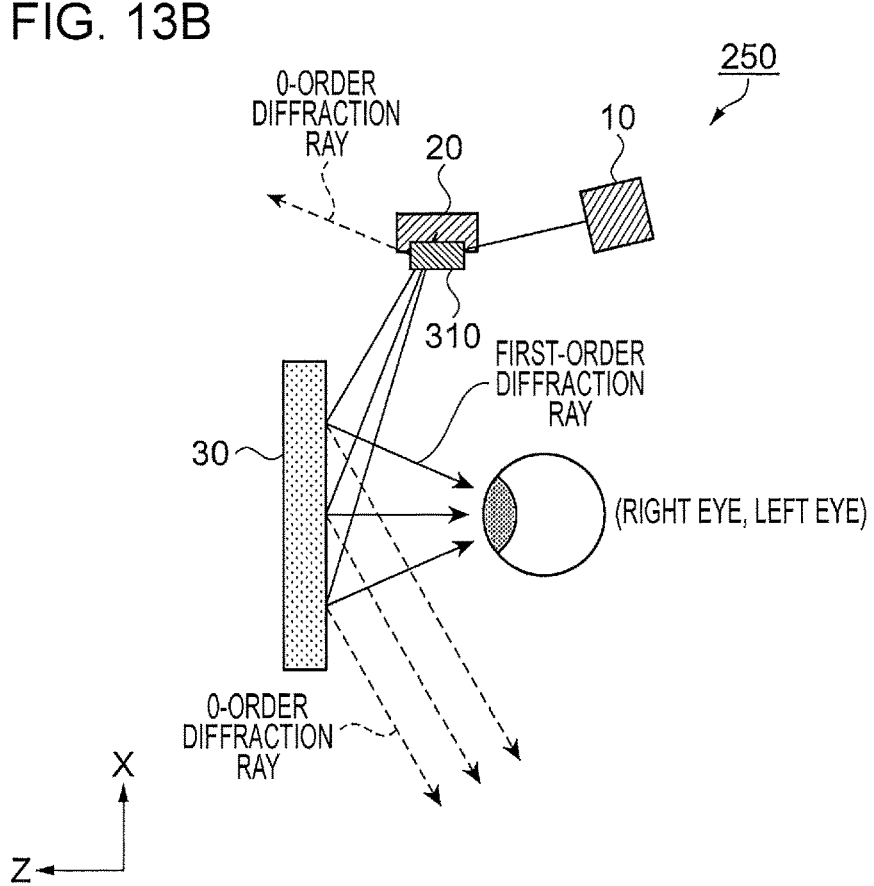

FIGS. 13A and 13B are schematic drawings illustrating a configuration of the image display apparatus of a third embodiment. The configuration of the image display apparatus will be described with reference to FIGS. 13A and 13B below.

An image display apparatus 250 of the third embodiment is different from the first embodiment described above in that a wavelength compensating element 310 as a second diffraction optical element having a function of the reflective diffraction optical element is provided on an optical path between the reflective diffraction optical element 30 and the light source 10 to cause light to enter the wavelength compensating element 310 before the scanning mirror 20, and other portions are substantially the same. Therefore, in the third embodiment, portions different from the first embodiment will be described in detail, and description of other overlapped portions is omitted as needed.

As illustrated in FIGS. 13A and 13B, the image display apparatus 250 of the third embodiment includes the light source 10, the scanning mirror 20 configured to reflect light from the light source 10, and the reflective diffraction optical element 30 configured to diffract image light reflected by the scanning mirror 20 and display the diffracted light to an observer in the same manner as the first embodiment.

The third embodiment is characterized in that the wavelength compensating element 310 is arranged on the optical path between the reflective diffraction optical element 30 and the light source 10. The wavelength compensating element 310 is capable of deviating the wavelength of light from the light source 10 deviated from a predetermined wavelength in the direction of compensating a deviation from the predetermined wavelength in advance before entering the reflective diffraction optical element 30.

Specifically, in the case where the wavelength of light is deviated from the predetermined wavelength such as a high-speed modulation which increase the speed of modulation of light in the light source 10, if the light having a deviated wavelength enters the reflective diffraction optical element 30, the direction of diffraction is also deviated (the position of the image is also deviated), so that the quality of a displayed image may be deteriorated. In other words, the obtained image is affected by the wavelength. In this manner, even when the high-speed modulation is effected in the light source 10, the positional deviation of the image may be restricted.

Examples of the wavelength compensating element 310 include the volume hologram as in the above-described embodiment. The method of manufacturing is the same as those in the above-described embodiments.

Arrangement of the wavelength compensating element 310 between the light source 10 and the scanning mirror 20 allows the wavelength compensating element 310 to be irradiated with light from the light source 10. Accordingly, even when the wavelength is changed by the high-speed modulation in the light source 10 or the like, an occurrence of deviation in direction of diffraction in the reflective diffraction optical element 30 can be restricted by using the wavelength compensating element 310.

Specifically, the wavelength compensating element 310 is capable of deviating the direction of the 0 order diffraction ray so as not to enter other optical components. Therefore, the wavelength compensating element 310 works as a filter and can deviate the direction of the 0 order diffraction ray generated simultaneously with the 1st order diffraction ray so as not to enter the scanning mirror 20.

In other words, the wavelength compensating element 310 can restrict positional misalignment of the image and deterioration of the image which may occur in the case where the wavelength is changed due to the temperature or the like and the light having a changed wavelength is reflected from the reflective diffraction optical element 30 without arranging the wavelength compensating element 310, whereby the diffraction angle is changed and hence the light becomes stray light in the optical system of the image display apparatus 250. Consequently, display at a high resolution is achieved.

A height relationship between the wavelength compensating element 310 and the scanning mirror 20 is preferably a positional relationship in which the 0 order diffraction ray coming out from the wavelength compensating element 310 does not hit the scanning mirror 20. For example, when the diameter of the scanning mirror 20 is 1 mm, the wavelength compensating element 310 is preferable deviated by approximately 1 mm or more. Accordingly, the 1st order diffraction ray can be proceeded toward the scanning mirror 20, and the 0 order diffraction ray can be proceeded in the direction deviated from the scanning mirror 20.

As described thus far in detail, according to the image display apparatus 250 of the third embodiment, the following advantages are achieved.

(4) According to the image display apparatus 250 of the third embodiment, the wavelength compensating element 310 is arranged on the optical path between the reflective diffraction optical element 30 and the light source 10, and light from the light source 10 enters the wavelength compensating element 310 before entering the scanning mirror 20. Therefore, even in the case where the wavelength of the light from the light source 10 is deviated from a regular wavelength due to the temperature change or the like, only the light having a regular wavelength can enter the scanning mirror 20 side by the intermediary of the wavelength compensating element 310. In other words, the reflective diffraction optical element may be used as wavelength compensation. Consequently, positional misalignment of the image light is restricted and the quality of the displayed image can be improved.

The mode of the invention is not limited to the above-described embodiments, and may be modified as needed without departing the gist or the thought of the invention which is understood from entire part of the specification, and is included within a technical range of the mode of the invention. The invention may be implemented in the following modes.

Modification 1

As described above, the height relationship between the position of the light source 10 and the position of the scanning mirror 20 is not limited to the arrangement at substantially the same height, and may not be the same height. For example, in the case where the light source 10 is arranged on a lower side with respect to the scanning mirror 20, the 0 order diffraction ray reflected from the scanning mirror 20 proceeds above the head, and hence can be prevented from entering other optical components.

In the case where the light source 10 is arranged on the lower side with respect to the scanning mirror 20, a center of gravity is located on the lower side and hence the stability is increased. Therefore, a fitting property of the head mounted display 1000 may be improved when being hooked on ears.

In contrast, in the case where the light source 10 is arranged on an upper side with respect to the scanning mirror 20, the light source 10 can be moved away from the observer's ears, so that the head mounted display 1000 can be moved toward the ears. Therefore, the head mounted display 1000 may be reduced in sizes.

Modification 2

As described above, the arrangement of the scanning mirror 20 is not limited to be on the upper side with respect to the observing point, and, for example, an arrangement of the scanning mirror 20 on the lower side with respect to the observing point is also applicable.

Modification 3

As described above, the case of the right side (right eye and one eye) in the image display apparatus 50 has been explained. However, the invention is not limited thereto, and the same phenomenon may occur in the case of the left side (left eye and the other eye), so that the invention may be applied to the case of the left eye.

Modification 4

As described above, the reflective diffraction optical element 30 of the third embodiment has a flat shape. However, the invention is not limited thereto and the reflective diffraction optical element 130 having a curved shape as in the second embodiment may be applied.

The entire disclosure of Japanese Patent Application No. 2015-002932, filed Jan. 9, 2015 is expressly incorporated by reference herein.

What is claimed is:

1. An image display apparatus configured to display an image in at least one of one eye and another eye, the image display apparatus comprising:
   an image generation unit configured to emit image light having a planar wave proceeding in a first direction; and
   a first diffraction optical element configured to deflect by diffraction a proceeding direction of the image light from the image generation unit to a second direction to cause the deflected image light to enter the one eye, wherein
   the first diffraction optical element includes a planar interference fringe formed in the interior thereof, and the first diffraction optical element is arranged such that a normal line of the planar interference fringe intersects a plane including the second direction and a third direction, which corresponds to a direction connecting the one eye and the other eye.

2. The image display apparatus according to claim 1, wherein
   the image generation unit is arranged at a position different from a position on a plane including the second direction and the third direction, and the first direction intersects the plane including the second direction and the third direction.

3. The image display apparatus according to claim 1, wherein the image generation unit includes a light source that emits light and a scanning mirror configured to scan the light so as to generate the image.

4. The image display apparatus according to claim 1, wherein
the interference fringe of the first diffraction optical element is formed of a portion having a first refractive index and a portion having a second refractive index, which is different from the first refractive index.

5. The image display apparatus according to claim 1, wherein
the first diffraction optical element is a volume hologram.

6. The image display apparatus according to claim 1, wherein
the first diffraction optical element has a curved end portion.

7. The image display apparatus according to claim 1, further comprising:
a second diffraction optical element that is arranged between the image generation unit and the first diffraction optical element so as to compensate light having a wavelength that has deviated from a predetermined wavelength included in the image light.

8. A method of manufacturing an image display apparatus according to claim 1, the manufacturing method comprising:
preparing a base material;
forming the planar interference fringe in an interior of the base material by performing interference exposure on the base material with a reference beam having a planar wave proceeding in the first direction and an object beam having a planar wave proceeding in the second direction; and
arranging the image generation unit configured to emit the image light having the planar wave and the base material which has been subjected to the interference exposure, wherein
arranging the base material is arranging the image generation unit and the base material such that the normal line of the planar interference fringe intersects the plane including the second direction and the third direction, which corresponds to the direction connecting the one eye and the other eye, to cause the image light having the planar wave to enter the base material in the first direction and cause the entered image light to be diffracted by the base material to proceed in the second direction, and enter the one eye.

9. An image display apparatus configured to display an image in at least one of one eye and another eye, the image display apparatus comprising:
an image generation unit configured to emit image light having a spherical wave centered in a first direction; and
a first diffraction optical element configured to deflect by diffraction the image light from the image generation unit so as to be centered in a second direction to cause the deflected image light to enter the one eye, wherein
the first diffraction optical element includes a spherical interference fringe formed in the interior thereof, and the first diffraction optical element is arranged such that a direction of an axis of the spherical interference fringe intersects a plane including the second direction and a third direction, which corresponds to a direction connecting the one eye and the other eye.

10. A method of manufacturing an image display apparatus according to claim 9, the manufacturing method comprising:
preparing a base material;
performing interference exposure on the base material with a reference beam having a spherical wave centered in the first direction and an object beam having the a spherical wave centered in the second direction to form the spherical interference fringe in an interior of the base material; and
arranging the image generation unit configured to emit the image light having the spherical wave and the base material which has been subjected to the interference exposure, wherein
arranging the base material includes arranging the image generation unit and the base material to be in line with the direction of the axis of the spherical interference fringe intersecting the plane including the second direction and the third direction, which corresponds to the direction connecting the one eye and the other eye, such that the image light having the spherical wave enters the base material centered in the first direction, and the entered image light is diffracted by the base material and enters the one eye so as to be centered in the second direction.

11. An image display apparatus configured to display an image in each of one eye and another eye, the image display apparatus comprising:
a first image generation unit configured to emit image light having a spherical wave; and
a first diffraction optical element configured to deflect by diffraction the image light from the first image generation unit so as to be centered in a first direction to cause the deflected light to enter the one eye,
a second image generation unit configured to emit image light having a spherical wave; and
a third diffraction optical element configured to deflect by diffraction the image light from the second image generation unit so as to be centered in a second direction to cause the deflected light to enter the other eye, wherein
the first diffraction optical element and the third diffraction optical element include spherical interference fringes formed in the interior thereof, the first diffraction optical element is arranged such that the direction of the axis of the spherical interference fringe intersects a plane including the first direction and a third direction which corresponds to a direction connecting the one eye and the other eye, and the third diffraction optical element is arranged such that the direction of the axis of the spherical interference fringe intersects the plane including the second direction and the third direction.

* * * * *